United States Patent
Wigren

(10) Patent No.: US 9,071,359 B2
(45) Date of Patent: *Jun. 30, 2015

(54) METHOD FOR NOISE FLOOR AND INTERFERENCE ESTIMATION

(75) Inventor: Torbjorn Wigren, Uppsala (SE)

(73) Assignee: Telefonaktiebolaget LM Ericsson, Publ., Stockholm (SE)

( * ) Notice: Subject to any disclaimer, the term of this patent is extended or adjusted under 35 U.S.C. 154(b) by 786 days.

This patent is subject to a terminal disclaimer.

(21) Appl. No.: 12/666,979

(22) PCT Filed: Jun. 29, 2007

(86) PCT No.: PCT/SE2007/050476
§ 371 (c)(1),
(2), (4) Date: Dec. 28, 2009

(87) PCT Pub. No.: WO2009/005420
PCT Pub. Date: Jan. 8, 2009

(65) Prior Publication Data
US 2011/0009070 A1    Jan. 13, 2011

(51) Int. Cl.
*H04B 17/00* (2006.01)
*H04B 17/345* (2015.01)
*H04B 17/354* (2015.01)
*H04B 17/382* (2015.01)

(52) U.S. Cl.
CPC ............ *H04B 17/345* (2015.01); *H04B 17/354* (2015.01); *H04B 17/382* (2015.01)

(58) Field of Classification Search
USPC ............... 455/67.13, 67.11, 63.1, 570, 114.2, 455/278.1, 283, 296
See application file for complete search history.

(56) References Cited

U.S. PATENT DOCUMENTS

| | | | |
|---|---|---|---|
| 6,374,096 B1 * | 4/2002 | Parr | 455/226.1 |
| 6,529,568 B1 * | 3/2003 | Richards et al. | 375/346 |
| 6,798,843 B1 * | 9/2004 | Wright et al. | 375/296 |

(Continued)

FOREIGN PATENT DOCUMENTS

| | | |
|---|---|---|
| EP | 1727388 A2 | 11/2006 |
| WO | 2006/038786 A1 | 4/2006 |
| WO | 2007/024166 A1 | 3/2007 |

OTHER PUBLICATIONS

Lundin, E. G. et al. "Interference Power Based Uplink Admission Control in Enhanced WCDMA." 2007 IEEE 66th Vehicular Technology Conference (VTC-2007 Fall), Sep. 30, 2007-Oct. 3, 2007, pp. 1726-1730.

*Primary Examiner* — Nay A Maung
*Assistant Examiner* — Erica Fleming-Hall
(74) *Attorney, Agent, or Firm* — Coats and Bennett, PLLC

(57) ABSTRACT

The present invention relates to a method and arrangement in a wireless communication system, e.g. an evolved UMTS Terrestrial Radio Access Network, for improved scheduling and admission control of the uplink by providing an improved determining of power-related quantities, e.g. neighbor cell interference levels, for specific tones and providing more accurate determination of noise-related quantities, e.g. noise floor power estimates, for specific tones. The method and arrangement obtains a neighbor cell interference measure for each subset of tones from at least a noise floor measure for each subset of tones based on combined power quantities from the total uplink power per subset of tones and dividing said noise floor measure into sub noise floor measures for each subset of tones, said dividing dependent on the bandwidth of each subset of tones.

18 Claims, 10 Drawing Sheets

(56) References Cited

U.S. PATENT DOCUMENTS

| | | |
|---|---|---|
| 6,850,500 B2 * | 2/2005 | Zeira et al. .................... 370/328 |
| 7,079,494 B2 * | 7/2006 | Marinier et al. ............. 370/252 |
| 7,158,474 B1 * | 1/2007 | Gerakoulis .................. 370/206 |
| 2001/0055952 A1 * | 12/2001 | Ficarra ........................ 455/67.3 |
| 2003/0194979 A1 * | 10/2003 | Richards et al. ............. 455/216 |
| 2004/0203397 A1 * | 10/2004 | Yoon et al. .................. 455/63.1 |
| 2005/0046612 A1 * | 3/2005 | Blunt et al. .................. 342/195 |
| 2005/0111429 A1 | 5/2005 | Kim et al. |
| 2005/0282542 A1 * | 12/2005 | Karabinis .................... 455/429 |
| 2006/0063545 A1 * | 3/2006 | Yang et al. ................... 455/513 |
| 2006/0068717 A1 * | 3/2006 | Gandhi et al. ............. 455/67.13 |
| 2006/0270433 A1 * | 11/2006 | Kelton et al. ................. 455/522 |
| 2007/0127588 A1 * | 6/2007 | Kim .............................. 375/267 |
| 2007/0202826 A1 * | 8/2007 | Dean ............................ 455/230 |
| 2007/0258537 A1 * | 11/2007 | Mailaender .................. 375/267 |
| 2008/0032732 A1 * | 2/2008 | Hosein ......................... 455/522 |
| 2008/0101323 A1 * | 5/2008 | Zuniga ......................... 370/342 |
| 2008/0198802 A1 * | 8/2008 | Zhang et al. ................. 370/329 |
| 2008/0267086 A1 * | 10/2008 | Wheatley et al. ............ 370/252 |
| 2008/0279121 A1 * | 11/2008 | Englund et al. .............. 370/278 |
| 2009/0092178 A1 * | 4/2009 | Sayana et al. ................ 375/227 |
| 2009/0104903 A1 * | 4/2009 | Karabinis ..................... 455/427 |
| 2009/0207746 A1 * | 8/2009 | Yuan et al. ................... 370/252 |
| 2009/0213919 A1 * | 8/2009 | Park et al. .................... 375/227 |
| 2010/0087149 A1 * | 4/2010 | Srinivasan et al. .......... 455/63.1 |

* cited by examiner ic communications systems. They
do, however, not disclose any means suitable for estimation of
the noise floor for single tones of the LTE uplink. Neither do
they address the filtering of leakage between tones of the own
cell, that is a consequence of the uplink multiple access
method used in LTE, which is different from the one in code
division multiple access. Finally, they do not address the
estimation of the neighbor interference level of specific tones
of the LTE uplink, exploiting a (possibly uncertain) estimate
of the thermal noise power floor of said specific tones, Therefore, there is a need for methods and arrangements for providing efficient and accurate real time estimates of the thermal noise power floor and the neighbor cell interference level,
applicable to the LTE uplink multiple access method.

The admission of new users into the LTE telecommunication system provides a way to regulate the load of LTE cells.
This admission may be performed in either the eNode Bs or in
another node. The admission rules may typically use information on the total power level of the cell, the own channel
power of the cell, the neighbor cell interference level of the
cell, as well as information on the thermal noise power floor
of the cell. Therefore there is a need for methods and arrangements for aggregating the total power, own channel power
and neighbor cell interference power, of each of the subsets of
frequency sub-bands of the total LTE frequency band, to
obtain the total cell power, the total own cell channel power
and the total neighbor cell interference level. Furthermore,
there is a need for means providing signaling of a subset of the
total cell power, the total own cell channel power, the total
neighbor cell interference level and the thermal noise floor
measure to an external node, or another function within the e
Node B.

METHOD FOR NOISE FLOOR AND INTERFERENCE ESTIMATION

TECHNICAL FIELD

The present invention relates to methods and devices for
interference estimation in cellular communications systems
and in particular to noise-floor estimation in long term evolution communication systems with combined frequency and
time division multiple access in the uplink.

BACKGROUND

The Long Term Evolution (LTE) telecommunication system is an evolution of the Wideband Code Division Multiple
Access (WCDMA) telecommunication system, introducing a
new air interface. LTE has many attractive properties that can
be used for future development of telecommunication services. A specific technical challenge in e.g. LTE and similar
systems is the scheduling of uplink channels to time intervals
and frequencies where the interference conditions are favourable, and where there exist a sufficient capacity in the uplink.
This can be done since in LTE, different users are allocated to
different sub-bands (also called tones) during each timeslot.
Due to leakage between sub-bands, other existing users of the
cell all contribute to the interference level of a specific user in
the uplink of LTE systems. Further, terminals in neighbour
cells also contribute to the same interference level. This is
because all users and common channels of a all cells transmit
in the same uplink frequency band when LTE technology is
used. The users of neighbor cells that transmit on the same
tones as users in the own cell will hence produce interference.
Hence two sources of interference is present—from users in
the own cell and from users of neighbor cells.

In order to schedule the traffic in the own and neighbor cells
efficiently, it is desirable to know the level of interference for
each tone of the uplink. With such knowledge it becomes
possible to schedule traffic to free tones where the interference level is low. In that way the transmission from the terminal (UE) to the base station (eNode B) will be efficient.
Reversing the argumentation, it is also clear that scheduling to
tones with a high interference level should be avoided, the
reason being that such a scheduling would interfere ongoing
uplink transmission in neighbor cells.

As discussed above, the interference power at a specific
tone is the sum of the interference from neighbor cells and the
leakage power from the other tones of the own cell. Now, the
leakage from other tones of the own cell depends in a known
way on the selected filter bank. Hence, knowledge of the total
power levels of the received signals of the uplink of the own
cell can be used to compute the expected leakage power, that
affects a specific tone. The consequence is that it is possible to
filter out the own cell interference, at least to some extent.
That would leave the neighbor cell interference as the major
source of interference, for each tone of the own cell.

The interference level of a specific tone of a cell in e.g. an
LTE system is usually expressed with respect to some reference, typically the thermal noise power floor. Consequently,
the noise power floor, have to be determined, in order to
determine the interference level. Determinations of noise
floor have in the past typically been associated with relatively
large uncertainties, often of a size of several dBs. This is an
effect of unknown scale factor errors of the front end receiver
electronics. Recently, means for estimation of the noise floor
have been disclosed in patent applications PCT/SE2005/
001242 and PCT/SE2006/050242. These applications
describe means for noise floor estimation that are suitable for

SUMMARY

A general problem with prior art LTE communications
networks is that neighbor cell interference estimations are
presented with an accuracy which makes careful scheduling
of uplink traffic difficult. In particular, the determination of
neighbor cell interference suffers from significant uncertainties, primarily caused by difficulties to estimate the noise
floor.

A general object of the present invention is to achieve
improved methods and arrangements for determining power-related quantities, e.g., neighbour cell interference levels, for
specific tones.

A further object of the present invention is to achieve
methods and arrangements providing more accurate determination of noise related quantities, e.g. noise floor power estimates, for specific tones of the LTE uplink.

These and other objects are achieved in accordance with
the attached set of claims.

According to one aspect, the invention comprises a method
for noise floor estimation from a sequence of power quantities, possibly combined from power quantities related to each
of a number of frequency sub-bands. Said method includes
the steps of estimating a noise floor power measure, typically
represented by a conditional probability distribution, for the
complete frequency band; and thereafter estimating sub noise
floor power measures for each frequency sub-band, said sub
noise floor measures typically represented by conditional
probability distributions, accounting for the bandwidth of
each frequency sub-band and resulting in values of said conditional probability distributions on pre-selected power grids.

Another aspect of the present invention comprises a
method of noise floor power estimation where said sequence of power quantities consists of a sequence of total powers of one or more of the subsets of frequency sub-bands.

Still another aspect of the present invention comprises a method of noise floor power estimation where said sequence of power quantities consists of a sequence of total powers of each subset of frequency sub-bands as well as a sequence of own cell signal powers related to one or more of the subsets of frequency sub-bands.

Yet another aspect of the present invention comprises a method of noise floor power estimation where said sequence of power quantities consists of a sequence of total powers of each subset of frequency sub-bands, as well as a sequence of own cell signal powers related to one or more of the subsets of frequency sub-bands, said sequence of own cell signal powers being removed from said total powers of each subset of frequency sub-bands by application of a filtering operation for obtaining a residual power measure related to remaining neighbor cell interference power; said residual power measure being represented by a probability distribution on a discretized residual power grid.

A further aspect of the present invention comprises a method of neighbor cell interference estimation from said conditional probability distribution representing the noise power floor measures for said subsets of sub-bands, and from said probability distributions representing the residual power measures, computing a probability distribution representing the neighbor cell interference on a pre-selected interference grid.

A still further aspect of the present invention comprises means for computation of optimal estimates and optimal variance estimates of neighbor cell interference powers and noise power floors for said subsets of sub-bands; said optimal estimates and optimal variance estimates being computed as conditional means exploiting the estimated conditional probability distribution of the neighbor cell interference powers and the thermal noise power floors for said subsets of sub-bands.

Yet a further aspect of the present invention comprises signaling means performing signaling of a subset of said total cell power, total own cell channel power, total neighbor cell interference power, and thermal noise power floor for said subsets of sub-bands, respectively, to another function of the eNode B, another eNode B, or another node for use in admission control algorithms; said signaling means being applied repeatedly.

An advantage of the present invention comprises estimation of neighbour cell interference levels, thereby enabling accurate real time scheduling of LTE traffic.

A further advantage of the present invention comprises estimation of a thermal noise power floor measure, a total neighbor cell interference measure, a total own cell power measure and a total own cell channel power measures, for said subsets of sub-bands, a subset of which can be signaled to a node which exploits the signaled information for admission control purposes.

BRIEF DESCRIPTION OF THE DRAWINGS

The invention, together with further objects and advantages thereof, may best be understood by referring to the following description taken together with the accompanying drawings, in which.

DETAILED DESCRIPTION

Figure 1:
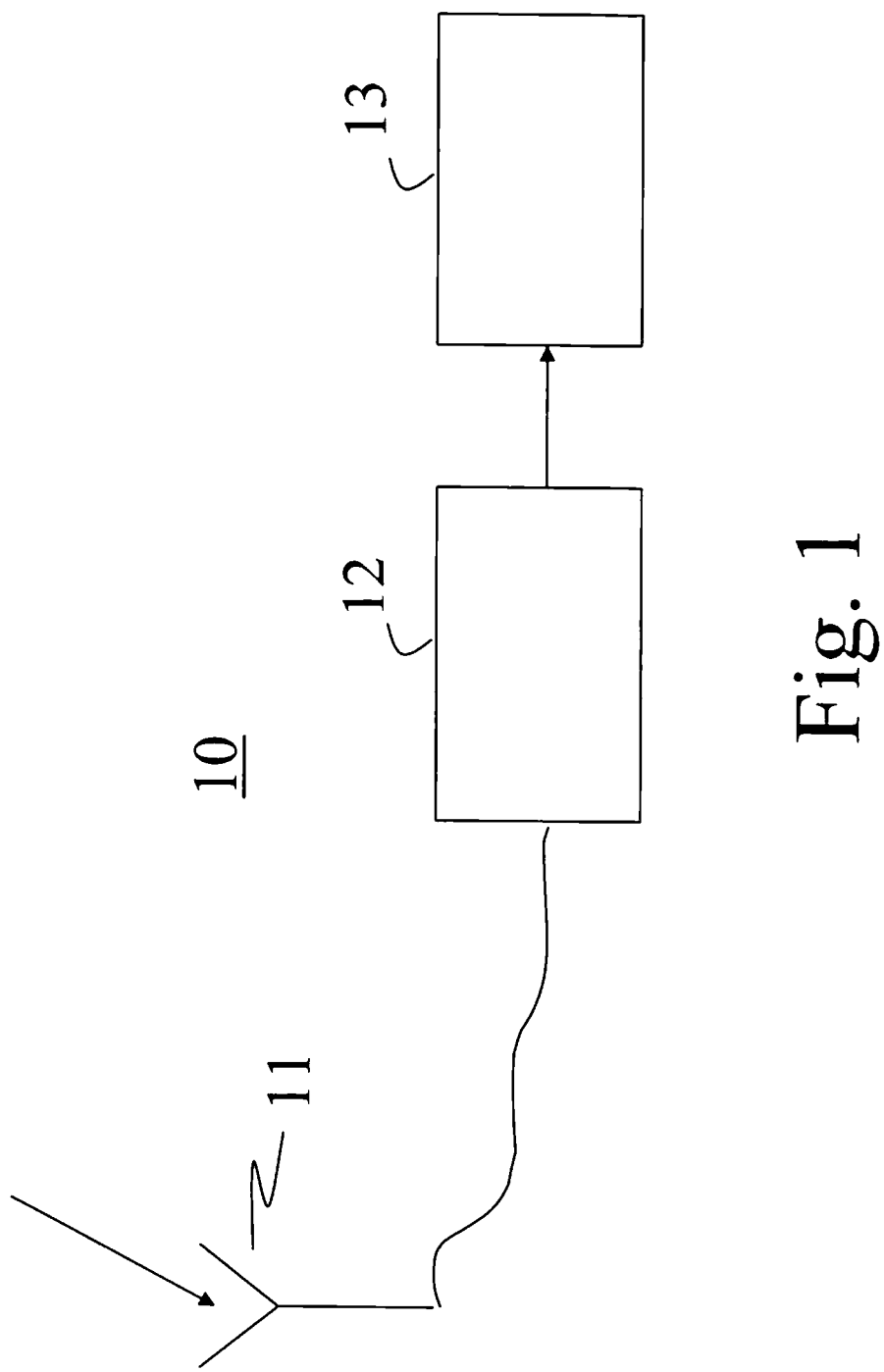
FIG. 1 shows a signal chain of an eNode B performing neighbor cell interference estimation

The present detailed description is introduced by a somewhat deeper discussion about how to perform noise floor estimation and the problems encountered by a plurality of possible solutions, in order to reveal the seriousness thereof.
Reference and Measurement Points In a typical signal chain of a eNode B 10, cf. FIG. 1, a received wideband signal from an antenna 11 first passes an analogue signal conditioning chain 12, which consists of cables, filters etc. Variations among components together with temperature drift, render the scale factor of this part of the system to be undetermined with about 0-3 dBs, when the signal enters a receiver. This is discussed further below. In the receiver 13, a number of operations take place. For interference estimation it is normally assumed that a total received power is measured at some stage.

There are several reasons for the difficulties to estimate the thermal noise floor power. One reason as indicated above is that the thermal noise floor power, as well as the other received powers, is affected by component uncertainties in the analogue receiver front end 12. The signal reference points are, by definition, at the antenna connector 11. The measurements are however obtained after the analogue signal conditioning chain 12, in the digital receiver 13. These uncertainties also possess a thermal drift.

The analogue signal conditioning electronics chain 12 does introduce a scale factor error of 0-3 dB between radio base stations (batch) that is difficult to compensate for. Any power measurement that is divided by the default value of the thermal noise power floor may therefore be inconsistent with the assumed thermal noise power floor by 0-3 dB. The effect would be an interference estimate that is also wrong by 0-3 dB. Considering the fact that the neighbor cell interference levels in LTE system are of the same order, it is clear that an error of 0-3 dB is not acceptable All powers are equally affected by the scale factor error $\gamma(t)$. Thus, when the interference ratios $I_R(t)$ (c.f. Appendix A) are calculated, the scale factor error is cancelled as $$I_R(t) = \frac{P^{Digital\ Receiver}(t)}{P_N^{Digital\ Receiver}} = \frac{\gamma(t)P^{Antenna}(t)}{\gamma(t)P_N^{Antenna}} = I_R^{Antenna}(t) \quad (1)$$

where $I_R^{DigitalReceiver}(t)$ and $I_R^{Antenna}(t)$ are the interference ratios as measured at the digital receiver and at the antenna, respectively; $P^{DigitalReceiver}(t)$ and $P^{Antenna}(t)$ are received powers at the digital receiver and the antenna, respectively; and $P_N^{DigitalRecover}$ and $P_N^{Antenna}$ are the thermal noise level as measured at the digital receiver and the antenna, respectively. However, equation (1) requires a measurement of the noise floor $P_N^{DigitalReceiver}$ in the digital receiver. As will be clear later, estimation of the absolute value of the neighbor cell interference also requires a prior thermal noise floor estimation step.

Figure 5:
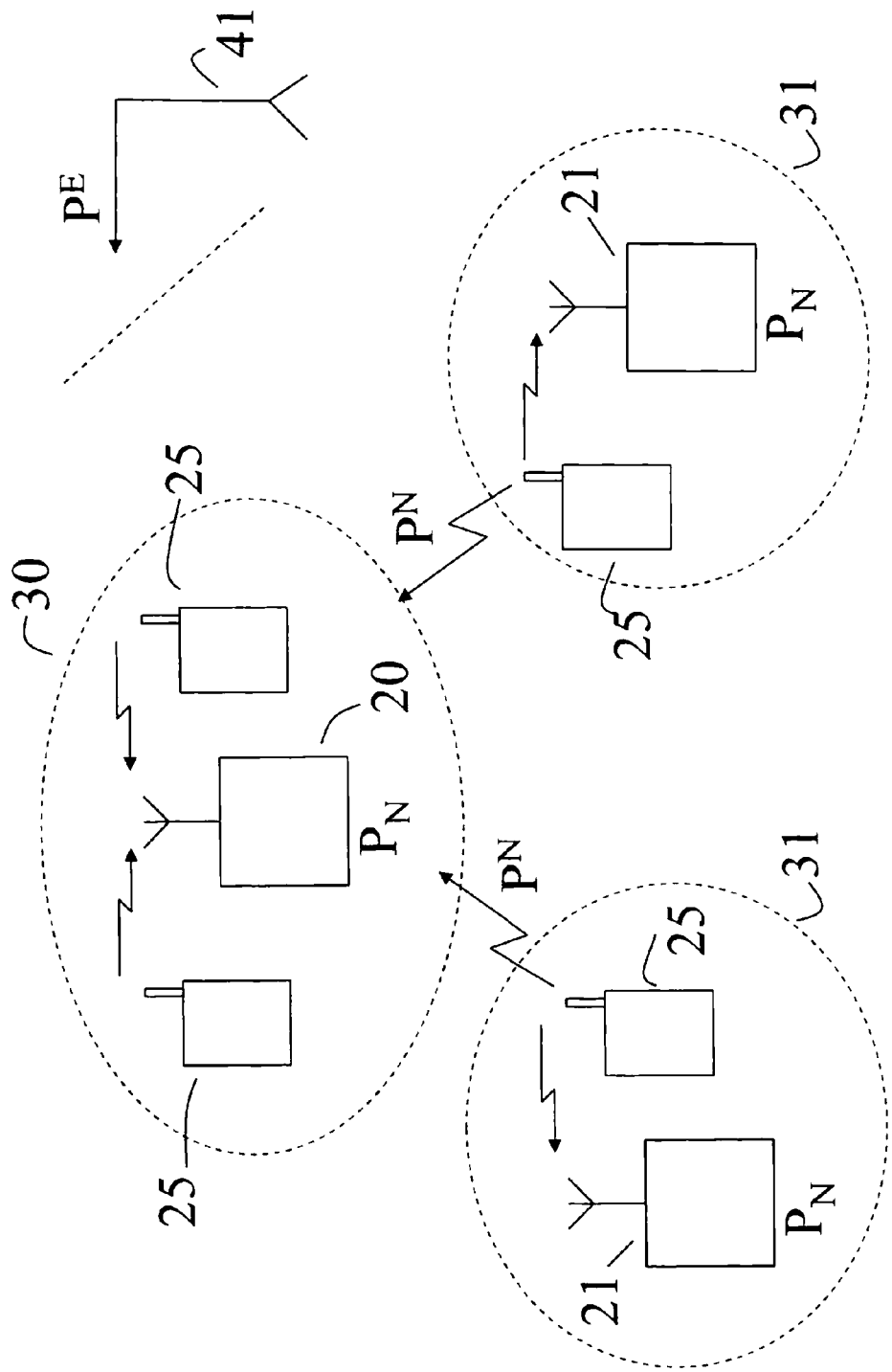
FIG. 5 illustrates signal powers occurring in a typical cellular mobile communication system.

FIG. 5 illustrates the contributions to power measurements in connection with a radio base station 20. The radio base station, e.g. an eNodeB in an E-UTRAN, is associated with a cell 30. Within the cell 30, a number of mobile terminals 25 are present, which communicate with the radio base station 20 over different links, each contributing to the total received power. The cell 30 has a number of neighbouring cells 31 within the same mobile communication system, each associated a radio base station 21. The neighbouring cells also comprise mobile terminals 26. The mobile terminals 26 emit radio frequency power and the sum of all such contributions is denoted $P^N$. There may also be other network external sources of radiation such as, e.g., a radar station 41. Contributions from such sources are denoted $P^E$. Finally, the term $P_N$ arises from the receiver itself.

Noise Floor

Observability of the Noise Floor

One reason for the difficulties to estimate the thermal noise floor power now appears, since even if all measurements are made in the digital receiver, the noise floor cannot be directly measured, at least not in a single e Node B. The explanation is that neighbor cell interference and interference from external sources also affect the tones in the receiver, and any mean value of such sources cannot be separated from the noise floor. Power measurements in the own cell channels can improve the situation but do, however, not solve the entire problem. On top of the above, power leakage from adjacent tones can add to the interference, particularly in cases with sampling and frequency errors.

Figure 2:
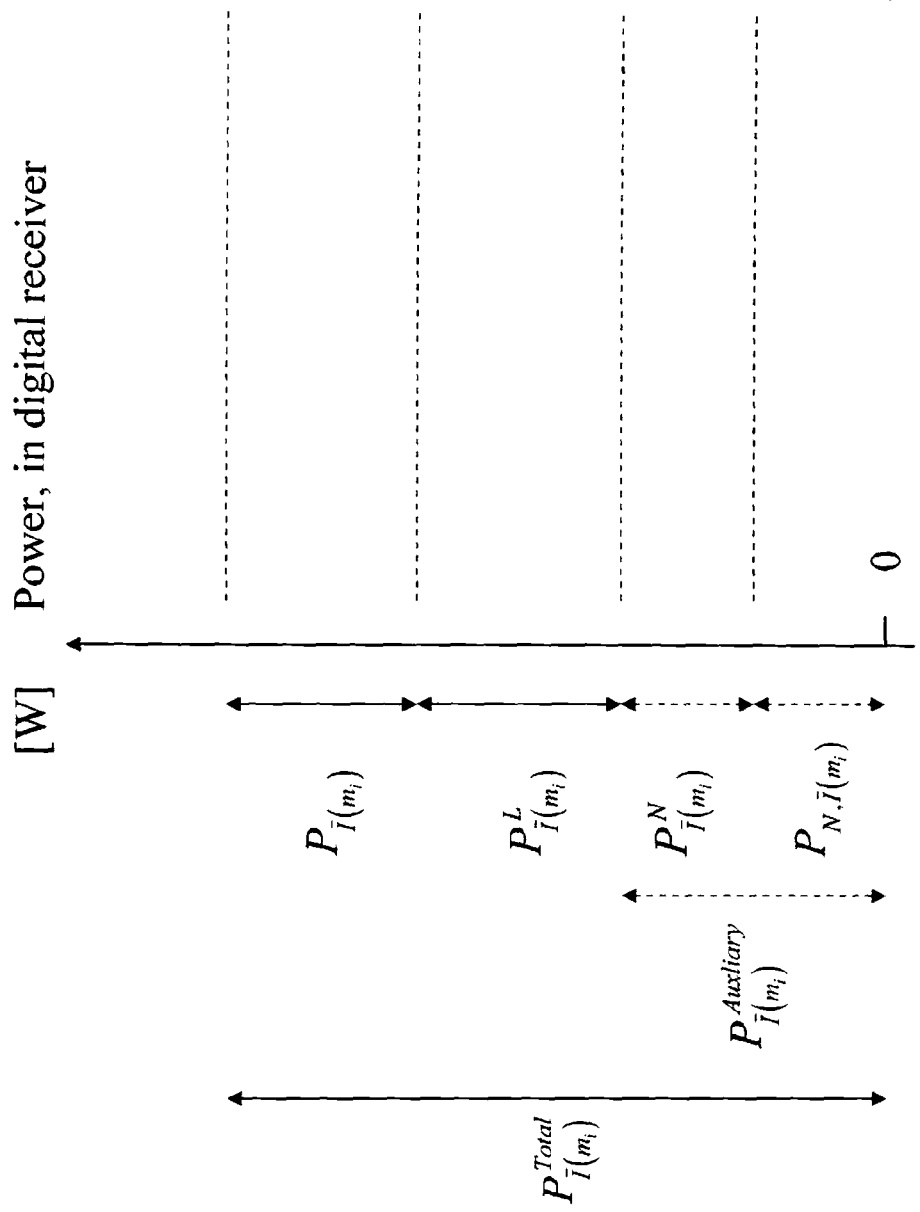
FIG. 2 is a schematic illustration of signal powers occurring in a typical LTE system in which the present invention can be implemented

FIG. 2 illustrates various contributions to power measurements in connection with an arbitrary eNodeB 20 in a wireless communication system, e.g. as illustrated in FIG. 5. In FIG. 2, solid arrows indicate measurable quantities while dashed arrows indicate non-measurable quantities. The eNodeB 20 is associated with a cell 30. Within the cell 30 a number of mobile terminals 25 are present, which communicate with the eNodeB 20 over different links, each contributing to the total received power in a sub-set of tones, to which the terminal is allocated. This power is denoted $P_{I(m)}(t)$, where m is the terminal number, $I(m)$ denote the subset of numbers of tones, used by one terminal in time slot t. $f_{I(m)}$ denotes the corresponding frequencies of the tones. The cell 30 has a number of neighboring cells 31 within the same LTE system, each associated with a respective eNodeB 21. The neighboring cells 31 also comprise mobile terminals 26. The mobile terminals 26 emit radio frequency power and the sum of all contributions is denoted by $P_{I(m)}^N$. There may also be leakage power from adjacent tones, denoted $$P_{\neg I(m)}^L.$$

Here ¬ I(m) denote tone numbers that are not in I(m). Finally, the thermal noise of the frequency sub-bands $f_{I(m)}$, $P_{N,I(m)}$, arises from the receiver itself. It should be noted that $P_{N,I(m)}$ is not the same as the thermal noise floor for the whole uplink frequency band.

It is clear from the above that at least $P_{I(m)}^N$ and $P_{N,I(m)}$ are not measurable and hence need to be estimated. Sometimes $$P_{\neg I(m)}^L$$

can be estimated from measurements of own cell powers of other users in the same cell—this is described further below. The total power measurement in the sub-set of tones, $P_{I(m)}^{Total}(t)$, can be expressed according to:

$$P_{I(m)}^{Total}(t)=P_{I(m)}^{N}(t)+P_{I(m)}^{L}(t)+P_{N,I(m)}+e_{I(m)}(t) \quad (2)$$

where $e_{I(m)}(t)$ models measurements noise.

It can be mathematically proven that linear estimation of $P_{I(m)}^N$ and $P_{N,I(m)}$ is not an observable problem. Only the quantity $P_{I(m)}^N + P_{N,I(m)}$ is observable from available measurements, provided that $$P_{\neg I(m)}^L.$$

Otherwise only $$P_{I(m)}^N + P_{N,I(m)} + P_{\neg I(m)}^L$$

is observable. The problem is that there is no conventional technique that can be used to separate the thermal noise power floor from power mean values originating from neighbor cell interference and other in-band interference sources.

Noise Floor Estimation

A possible solution to achieve noise floor estimation is to use costly and individual determination of the thermal noise floor of each radio base station in the field, in order to achieve a high enough neighbour cell interference estimation performance. The establishment of the default value for the thermal noise power floor, as seen in the digital receiver requires reference measurements performed over a large number of radio base stations either in the factory or in the field. Both alternatives are costly and need to be repeated as soon as the hardware changes. The above approach to solve the problem would require calibration of each eNodeB individually. This would however be very costly and is extremely unattractive. Furthermore, temperature drift errors in the analogue signal conditioning electronics of perhaps 0.7-1.0 dB would still remain.

Another potential approach would be to provide an estimation of the thermal noise power floor. One principle for estimation of the thermal noise power floor is to estimate it as a minimum of a measured or estimated power quantity comprising the thermal noise floor. This minimum is typically computed over a pre-determined interval in time. If no measurements of channel power and in-cell interference are available, the power in question is the total received power, in the subset of tones corresponding to one user in a time slot.

It is a well known fact that the thermal noise floor contribution always is present, and consequently it can be concluded that if measurement uncertainties are neglected, the noise floor contribution has to be equal to or smaller than the minimum value of the total received power in a subset of tones received within a certain period of time. In essence, the minimum value of the total power within a certain time interval constitutes an upper limit of the unknown noise floor.

A possible solution according to the above discussion could provide a hard algorithm for estimation of the thermal noise power floor in the sense that a hard minimum value is computed over a sliding window and used as an estimate of the thermal noise power floor. Consequently, the noise floor could be determined as the minimum value (over a selected interval of time) of either of the following:

The sum of the power of the noise floor and the power of neighbor interference.

The total received power.

The neighbor interference is then subsequently calculated from the above of the above two quantities. The lower of the two above quantities does not allow a calculation of the neighbor cell interference. In case the interference from other tones of the cell is not measured, then it may be lumped together with the neighbor cell interference, to a total interference measure.

Figure 3:
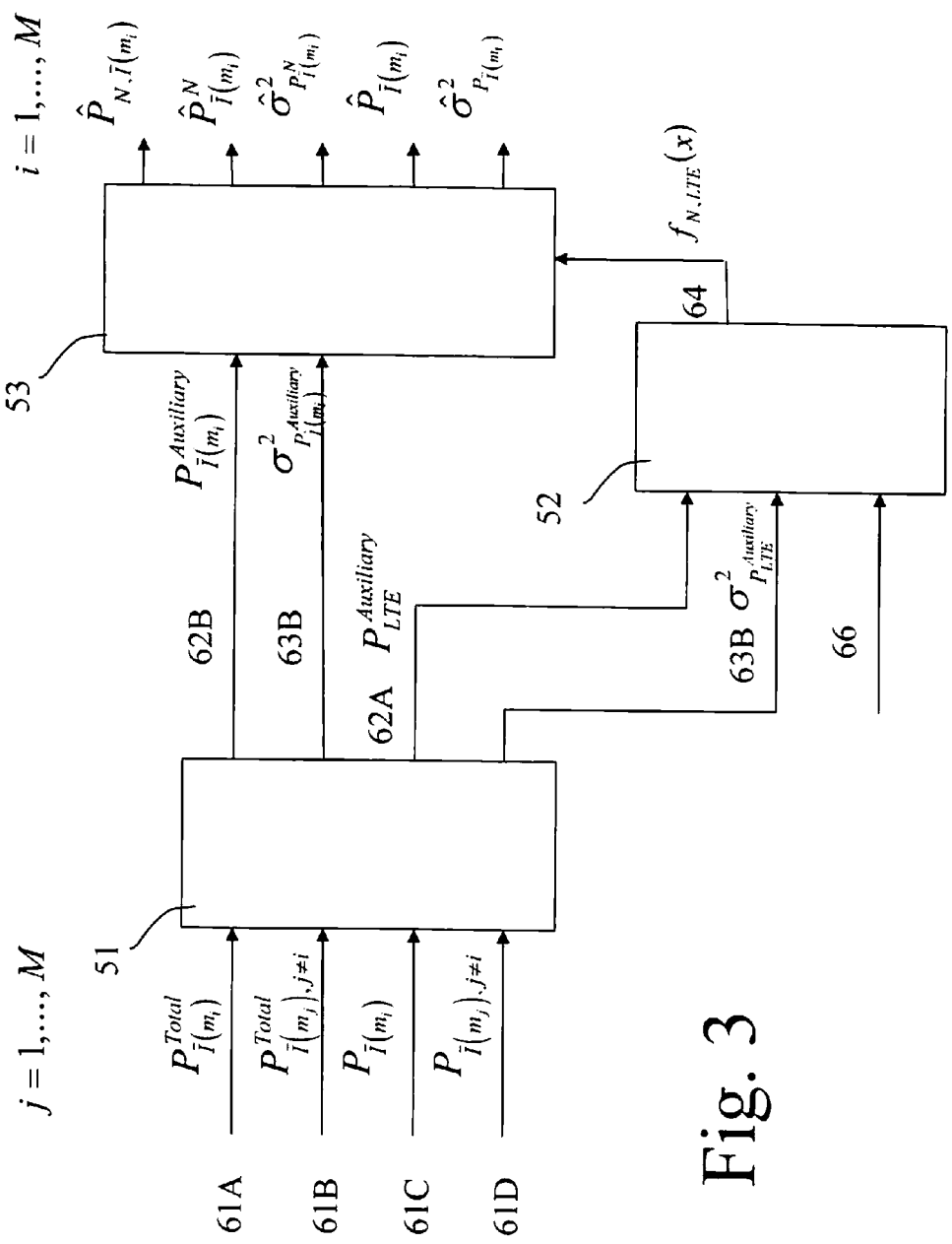
FIG. 3 is a schematic illustration of functionalities of possible solutions.
Figure 4A:
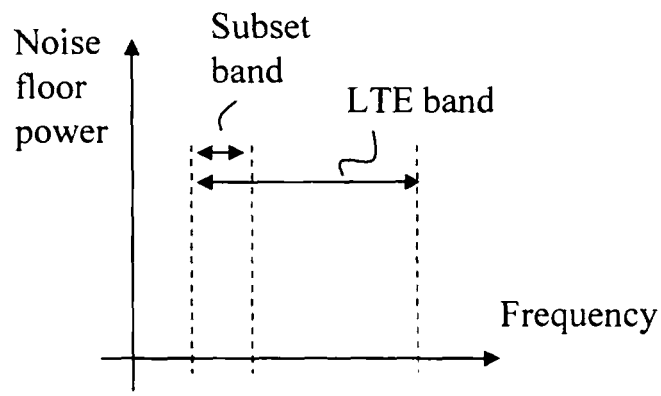
FIGS. 4a and 4b are diagrams illustrating a transformation of a probability distribution function according to the invention.
Figure 4B:
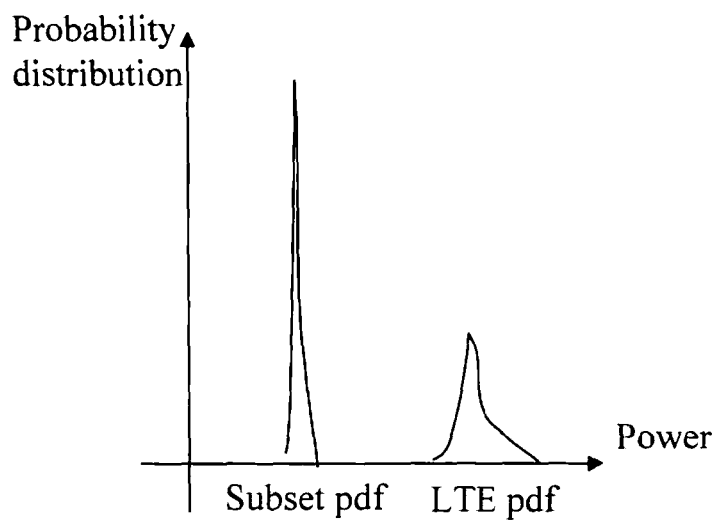

With reference to FIG. 3, another possible solution provides a different principle, based on soft estimation of the thermal noise power floor and the neighbor cell interference. In the most advanced form, the neighbor cell interference estimation is performed in three main blocks.

The first block 51, i.e. power estimation block, applies a so called Kalman filter for estimation of certain power quantities that are needed by subsequent processing blocks. The principal use of the Kalman filter is known from prior art; however, the signals and in particular the model and compensation for leakage power discussed below, have not been previously disclosed. Specifically, the block 51 receives a number of inputs 61A-D comprising the measured received total power $P_{\bar{I}(m)}^{Total}(t)$ in the subset of tones of terminal in 61A, the measured total power of the subsets of tones of other terminals $m_i$, $P_{\bar{I}(m_i)}^{Total}(t)$ 61B, the measured channel power $P_{\bar{I}(m)}(t)$ in the subset of tones of terminal m 61C, and the measured channel power of the subsets of tones of other terminals $m_i$, $P_{\bar{I}(m_i)}(t)$ 61D, and provides outputs comprising power estimates 62A, 62B and corresponding standard deviations 63A, 63B. The output 62A is the estimate of a power quantity being the sum of neighbor cell interference power and thermal noise floor power for each sub-set of tones (i.e. multiple measurements), and the output 63A is the corresponding variance. The output 62B is also the estimate of a power quantity being the sum of neighbor cell interference power and thermal noise floor power for each sub-set of tones, and the output 63B is the corresponding variance. Since the outputs are from the Kalman filter arrangement, these parameters are the only ones needed to define the estimated Gaussian distributions that are produced by the filter. Thus, enough information is given to define the entire probability distribution information of the power estimates.

The second block 52 applies Bayesian estimation techniques known from prior art in order to compute a conditional probability density function of the minimum of one of the above mentioned power quantities. The minimum also accounts (by Bayesian methods) for the prior distribution of the thermal noise power floor, thereby improving the average performance of the estimation, when evaluated over an ensemble of radio base stations. The actual value of the noise floor can also be calculated by a calculation of the mean value of the estimated conditional probability distribution function. The prior art algorithm can be applied in two ways:

To each sub-set of tones, separately.

To the whole LTE uplink frequency band, after summation of powers and variances.

The first alternative is not a good strategy. First, individual estimation for each frequency is likely to be sensitive to random errors. Secondly, several thermal noise floor estimators need to be run. This consumes a large amount of dynamic memory. For the above reason, the first alternative will not be further discussed here.

Specifically, for the second alternative the block 52 receives the power estimates 62A and the corresponding standard deviations 63A as inputs, and provides an output 64 comprising the estimated probability distribution of an extreme value, typically the minimum over a sliding window, intended to represent a good approximation of the conditional probability distribution of the thermal noise power floor. Parameters 66 giving information about a prior expected probability distribution of the noise floor power is provided to the conditional probability distribution estimation block 52, in order to achieve an optimal estimation.

The third block 53 performs the following steps

Estimation of the conditional probability distribution of the thermal noise power floor of each subset of tones, for each time slot (typically representing a user terminal), from the conditional probability distribution of the uplink thermal noise power floor, obtained as the signal 64.

Estimation of the neighbor cell interference power, for each time slot (typically representing a user terminal), from the conditional probability distribution of the thermal noise power floor of each subset of tones according to the above step, and from the signals 63A and 63B obtained from the block 51.

Estimation of optimal estimates of the thermal noise floor and the corresponding variance, as well as the neighbor cell interference and the corresponding variance, said optimal estimates being obtained as conditional means of the conditional probability distributions of the first 2 bullets.

A modified version of the previously described possible method discloses using a simplified soft solution. Only the total uplink LTE power is measured and a simplified algorithm for only thermal noise power floor estimation is applied. The simplified algorithm accordingly applies a simplified, one-dimensional Kalman filter for estimation. The reason why this filtering step is used is that the subsequent (still soft) processing blocks require probability distributions as input. These are best generated by a Kalman filter in the first processing block, corresponding to block 51 of the previously described method. Using this method alone, the corresponding thermal noise power floor values for the subsets of tones can then be computed as described below. However, the computation of estimates of neighbor cell interference requires further processing.

Subsequently the thermal noise power floor is estimated with the complete soft algorithm, as described with reference to FIG. 3. Contrary to that previously described possible method, an (optimal) estimated value of the thermal noise power floor is calculated.

The estimation of neighbor cell interference is a critical component in that this provides an input to an LTE scheduler function of the eNodeB.

Therefore, there is a definite need for methods and arrangements enabling soft estimation of the thermal noise floors and neighbor cell interference levels for selected subsets of tones. Noise floor estimation is performed by the same algorithm for these two cases.

Further definition of the present invention needs a description of the LTE air-interface, LTE scheduling mechanism, and LTE admission control algorithm (cf. also Appendix A) for the soft noise floor estimation algorithm.

1. The leakage of power from adjacent tones to any tone of the LTE uplink causes an additional source of interference. The disclosed techniques for estimation of the thermal noise power floor of subsets of tones and for subsequent estimation of neighbor cell interference power to the same subsets of tones would benefit from a removal of said leakage power.

2. It is beneficial for the LTE scheduler to know the level of neighbor cell interference in a subset of tones of the LTE uplink for a specific time slot. For this reason it is essential to provide means for estimation of the neighbor cell interference power and the thermal noise power floor, for each of said subset of tones of the LTE uplink. Given this information, the scheduler can assess the fraction of neighbor cell interference, as compared to the noise floor, for each subset of tones (a subset may also contain only one single tone). Note that no user may be allocated to some of said subsets of tones. Using the information on the fraction of neighbor cell interference, the scheduler can avoid scheduling of new users to subsets of tones with high values of said fraction of neighbor cell interference. This improves the transmission of information from the new users, so allocated. In addition, the new users avoid creating interference that would have corrupted users in neighbor cells that are the likely reason for any high level of said fraction of neighbor cell interference.

3. The admission control function of the LTE system also needs to know the levels of neighbor cell interference, in order to be able to avoid admission of users in case said fraction(s) of neighbor cell interference would be too high, overall or in selected subsets of tones.

4. There is a need for signaling the subset of said total cell power, total own cell channel power, total neighbor cell interference power, and thermal noise power floor for said subsets of sub-bands, to another function of the eNodeB, another eNodeB, or another node for use in admission control algorithms.

In order to meet the above mentioned needs, multiple measures have been identified:

In order to meet the first need, processing mean of the block 51 are defined it is first noted that all powers and measurements are assumed to model the sum of powers from all tones of the subset $m_i$. The following models are then introduced for the subset $m_i$:

$$P_{I(m_i)}(t+1) = P_{I(m_i)}(t) + w_{I(m_i)}(t) \quad (3)$$
$$P_{I(m_i)}^{Auxiliary}(t+1) = P_{I(m_i)}^{Auxiliary}(t) + w_{I(m_i)}^{Auxiliary}(t), \quad i = 1, \ldots M$$

$$P_{I(m_i),measurement}(t) = P_{I(m_i)}(t) + e_{I(m_i)}(t) \quad (4)$$
$$P_{I(m_i)measurement}^{Total}(t) =$$
$$\quad P_{I(m_i)}(t) + P_{I(m_i)}^{Auxiliary}(t) + P_{I(m_i)measurement}^{L}(t) + e_{I(m_i)}^{Total}(t).$$

Above, (3) is the state model and (4) is the measurement model. The states are selected as the own channel power of the subset of tones $m_i$, and the auxiliary power, which is intended to model the thermal noise power floor plus the neighbor cell interference power. $w_{I(m_i)}(t)$ and $w_{I(m_i)}^{Auxiliary}(t)$ denote the system noises associated with the selected states. These quantities are assumed to be Gaussian distributed.

The measurement equations (4) model the measurement of the own power of the subset of tones $m_i$, as well as the total measured power of the subset of tones $m_i$. The quantities $e_{I(m_i)}(t)$ and $e_{I(m_i)}^{Total}(t)$ denote the measurement noises of the selected measurements. These noises are assumed to be Gaussian distributed.

The quantity $P_{I(m_i),measurement}^{L}(t)$ has not been disclosed before. It is a pseudo-measurement that models the leakage of power from adjacent tones into the tones of the subset $m_i$. As can be seen, it can be moved over to the left side of the last equation of (4), thereby correcting the total power measurement. A suitable model for the leakage power is assumed to be $$P_{I(m_i),measurement}^{L}(t) = K \sum_{f_j \in I(m_i)} \sum_{f_k \neq f_j} P_{f_k,measurement}(t) \left( \frac{\sin\left(\frac{2\pi(f_k - f_j)}{\Delta f_{Tone}}\right)}{\left(\frac{2\pi(f_k - f_j)}{\Delta f_{Tone}}\right)} \right)^2 \quad (5)$$

where K is a constant and $P_{f,measurement}(t)$ denotes the channel power measurement on the single tone with frequency f.

Given the equations (3)-(5) a Kalman filter can be defined and executed.

To meet the second need, i.e. to obtain an estimate of the thermal noise power floor for each subset of tones, the approach described here is to apply one instance of a sliding window noise floor estimator to the sum of the estimated auxiliary powers of the respective subsets of tones estimated with a Kalman filter based on the model defined in equations (3)-(5). These are obtained as the signals 62A and 62B. The input to the noise power floor estimator then consists of auxiliary power of the complete LTE uplink frequency band, as illustrated in FIG. 2. In principle, the estimation of the thermal noise power floor can also be performed according to FIG. 3, using the total wideband power of the LTE uplink frequency band. This can sometimes be performed directly at the radio unit of the eNodeB.

For a "soft scaling" algorithm, the output is the conditional probability distribution of the thermal noise power floor of the LTE uplink band discretized on a user chosen power grid (see appendix A for details). This signal is provided as the entity 64. This conditional probability distribution is denoted $f_{P_{S,LTE}}(x)$, where x denotes a power. The discretization is omitted here, for notational convenience.

The problem is now that the noise power floor of the subsets of tones differ from the noise power floor of the complete uplink LTE band. However, by performing a change of power variables a transformation that yields the desired conditional probability distributions results. From the definition of a probability distribution function it follows that $$f_{P_{N,I(m_i)}}(x) = \frac{d}{dx} F_{P_{N,I(m_i)}}(x), \quad i = 1, \ldots, M, \quad (6)$$

where $$F_{P_{N,I(m_i)}}(x), \quad i = 1, \ldots, M,$$

denotes the corresponding cumulative probability distribution functions. By definition and use of the properties of thermal noise $$F_{P_{N,I(m_i)}}(x) = Pr(P_{N,j(m_i)} \leq x) \quad , i = 1, \ldots, M, \quad (7)$$
$$= Pr\left(\left(\Delta f_i / \sum_{i=1}^{F} \Delta f_i\right) P_{N,LTE} \leq x\right)$$
$$= Pr\left(P_{N,LTE} \leq \left(\sum_{i=1}^{F} \Delta f_i / \Delta f_i\right) x\right)$$
$$= F_{P_{N,LTE}}\left(\left(\sum_{i=1}^{F} \Delta f_i / \Delta f_i\right) x\right)$$

from which it follows from (6) that $$f_{P_{N,\bar{I}(m_i)}}(x) = \left(\frac{\sum_{i=1}^{F} \Delta f_i}{\Delta f_i}\right) f_{P_{N,LTE}}\left(\left(\sum_{i=1}^{F} \Delta f_i / \Delta f_i\right) x\right), \quad (8)$$

$$i = 1, \ldots, M.$$

Following a discretization of equation (8) together with an estimation of the noise power floor of the complete LTE uplink band represents a good strategy since all available signal energy is used and since only one instance of the thermal noise power floor algorithm is used.

A "hard scaling" algorithm provides a quantity $P_{N,LTE}^{Hard}$ which is the minimum of the measures in the sliding window. From this it can be calculated $$P_{N,\bar{I}(mi)}^{Hard} = \frac{\Delta f_i}{\sum \Delta f_i} P_{N,LTE}^{Hard}.$$

To meet the third need, i.e. to obtain estimates of the neighbour cell interference power, two main alternatives exist
Hard neighbor cell interference estimation.
Soft neighbor cell interference estimation.
To describe the first alternative of hard estimation, the input to this computation consists of
The measured own channel power of the subset $m_i$ of tones, $P_{\bar{I}(m_i)}(t)$, i=1, ... M.
The measured total power of the subset $m_i$ of tones, $P_{\bar{I}(m_i)}^{Total}(t)$, i=1, ..., M.
The optimal estimate of the thermal noise power floor of the subset $m_i$ of tones, $\hat{P}_{N,\bar{I}(m_i)}(t)$, i=1, ..., M.
The (pseudo-) measured own cell uplink leakage power, $P_{\bar{I}(m_i)}^{L}(t)$, i=1, ..., M, cf. (5).
The estimate of the neighbor cell interference is then computed as $$\hat{P}_{\bar{I}(m_i)}^{N}(t) = P_{\bar{I}(m_i)}^{Total}(t) - P_{\bar{I}(m_i)}(t) - P_{\bar{I}(m_i)}^{L} - \hat{P}_{N,\bar{I}(m_i)}(t),$$
$$i=1, \ldots, M. \quad (9)$$

The optimal estimate of the thermal noise power floor may be computed softly or hardly (i.e. as a minimum value). If a soft method is used for noise floor estimation then the thermal noise power floor is given by the so called conditional mean, computed from the conditional probability density function $$f_{P_{N,\bar{I}(m_i)}}(x).$$

In the continuous domain, the formula for the computation is $$\hat{N}_{f_i}(t) = \int_{-\infty}^{+\infty} x f_{P_{N,\bar{I}(m_i)}}(x) dx, \quad i = 1, \ldots, M. \quad (10)$$

In a practical implementation, the integral is replaced by a sum, over a discretization grid. The same one-dimensional grid that is used for estimation of $$f_{P_{N,\bar{I}(m_i)}}(x)$$

is preferably used.

To describe the second approach of soft neighbor cell interference estimation it is noted that this approach differs from the hard alternative in that a probability distribution function for the neighbor cell interference is first computed. The optimal estimate of the neighbor cell interference then follows by a computation of the conditional mean of this probability distribution function. An advantage of this approach is that it is optimal. A further advantage is that it is possible to compute an uncertainty measure of the computed optimal estimate. This measure is the so called conditional variance. The uncertainty is highly valuable for LTE scheduling and admission control operation, when signaled to said scheduling and admission control functions/nodes.

Noting that after filtering in the block 51, and estimation of the conditional probability distribution of the thermal noise power floor in the block 52 (cf. Appendix A), the following equation holds)

$$P_{\bar{I}(m_i)}^{N}(t) = P_{\bar{I}(m_i)}^{Auxiliary}(t) - P_{N,\bar{I}(m_i)}(t), i=1, \ldots, M, \quad (11)$$

Since the two stochastic variables on the right hand side of (11) have both been characterized in terms of their conditional probability distributions, it follows that the conditional probability distribution function of the neighbour cell interference power of each subset $m_i$ of tones can be computed by a computation of the distribution of the difference between two stochastic variables. The following (known) result can be used for this purpose:

When considering two stochastic variables X and Y with distributions $f_X(x)$ and $f_Y(y)$, the difference Z=X-Y has the distribution $$f_Z(z) = \int_{-\infty}^{+\infty} f_X(x) f_Y(z+x) dx.$$

In a practical implementation all continuous quantities are discretized on their own individual grid. Note that the probability distribution of the auxiliary powers is provide by the signals 63A and 63B, whereas the conditional probability distribution of the thermal noise power floor is provided by equation (8), exploiting the input 64 form block 52.

In order to describe the procedure for soft estimation of the thermal noise power floor, the following steps are used in a preferred embodiment:
Step 1:
Inputs: The following input signals are used $$f_{P_{\bar{I}(m_i)}}(t),$$

a Gaussian, distribution with mean obtained from 63A and a variance obtained from 63B, i=1, ..., M.
$f_{N,\bar{I}(m_i)}(t)$, the conditional probability distribution of the thermal noise power floor estimator obtained from (8)
Both the above quantities are discretized.
Computation: This is performed according to the Prior result, resulting in the distribution $$f_{P_{\bar{I}(m_i)}^{N}}(z), \quad i = 1, \ldots, M.$$

Step 2: The optimal estimate of the neighbor cell interference, and the corresponding optimal variance, are computed as conditional means $$\hat{P}^N_{I(m_i)}(t) = \int_{-\infty}^{+\infty} x f_{P^N_{I(m_i)}}(x) dx, \quad i = 1, \ldots, M, \quad (12)$$

$$\hat{\sigma}^2_{P^N_{I(m_i)}}(t) = \int_{-\infty}^{+\infty} \left(x - \hat{P}^N_{I(m_i)}\right)^2 f_{P^N_{I(m_i)}}(x) dx, \quad i = 1, \ldots, M, \quad (13)$$

using a suitable discretization.

The scheduling and primarily the admission control algorithms of the LTE system, require signaling of the quantities estimated above, to the node(s) where the scheduling and admission control algorithms are located. The following alternative pieces of information are useful to transmit to the scheduling and admission control nodes of the LTE system:

1. $\hat{P}_{N,I(m_i)}, \hat{P}^N_{I(m_i)}, \hat{\sigma}^2_{P^N_{I(m_i)}}, \hat{P}_{I(m_i)}(t), \hat{\sigma}^2_{P_{I(m_i)}} i = 1,$ $\ldots, M, cellID$ (implicitly or explicitly).

2. $\hat{P}_{N,I(m_i)}, \hat{P}^N_{I(m_i)}, \hat{P}_{I(m_i)}(t), i = 1, \ldots, M \ i = 1,$ $\ldots, I, cellID$ (implicitly or explicitly).

3. $\hat{P}_{N,I(m_i)}, \hat{P}^N_{I(m_i)}/\hat{P}_{N,I(m_i)}, \hat{\sigma}^2_{P^N_{I(m_i)}}/\hat{P}^2_{N,I(m_i)}, \hat{P}_{I(m_i)}/\hat{P}_{N,I(m_i)},$ $\hat{\sigma}^2_{P_{I(m_i)}}/\hat{P}^2_{N,I(m_i)} \ i = 1, \ldots, M, cellID$ (implicitly or explicitly).

4. $\hat{P}_{N,I(m_i)}, \hat{P}^N_{I(m_i)}/\hat{P}_{N,I(m_i)}, \hat{P}_{I(m_i)}/\hat{P}_{N,I(m_i)},$ $i = 1, \ldots, I, cellID$ (implicitly or explicitly).

In addition to the above-discussed algorithms, the interfacing of them into the existing eNodeB system needs some enhancements.

In the description above, it is assumed that the power estimations concern uplink LTE communication. The power measurements are in such cases performed by a node in the radio access network (RAN), typically the eNodeB. However, at least parts of the procedure, e.g. the determining and/or estimating steps may also be performed in other parts of the communication network.

Figure 6:
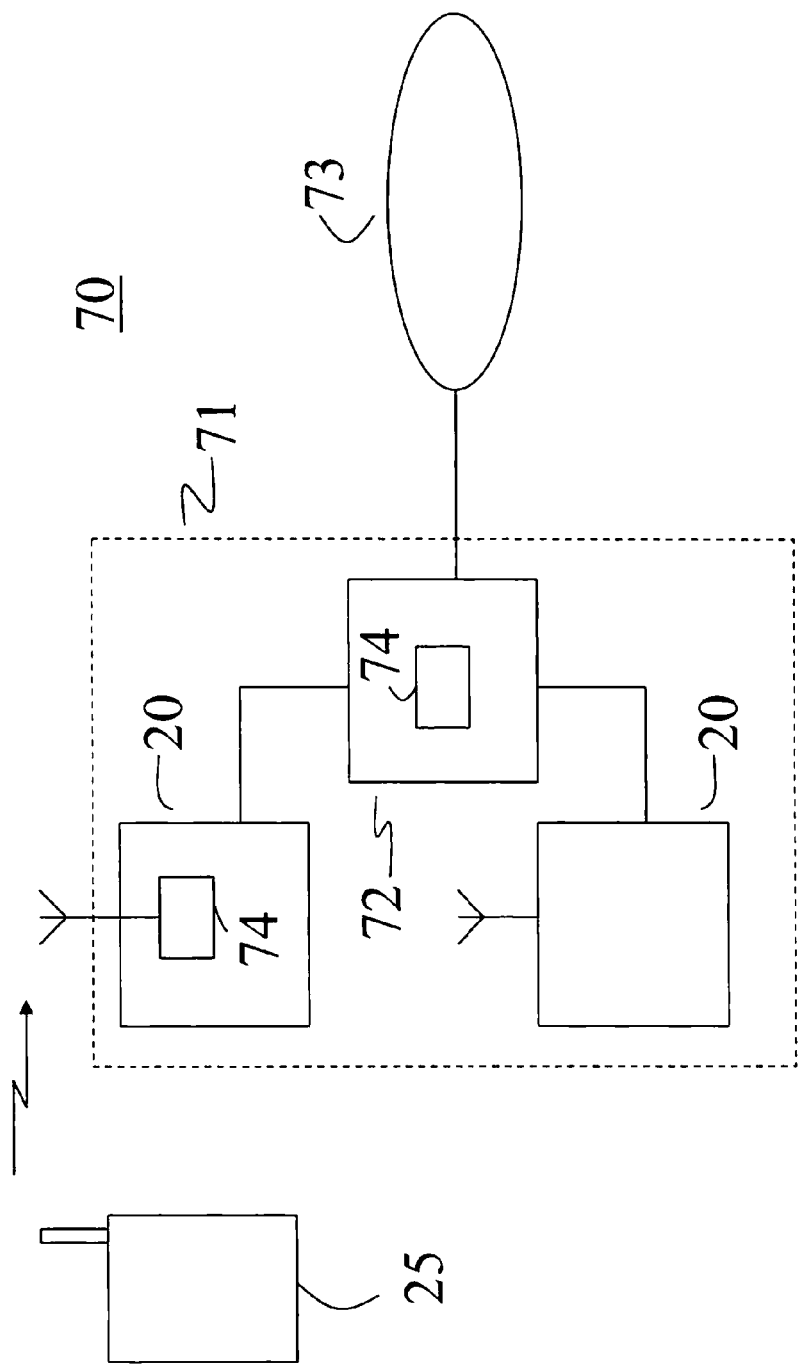
FIG. 6 illustrates main parts of an embodiment of a system according to the present invention.
Figure 7A:
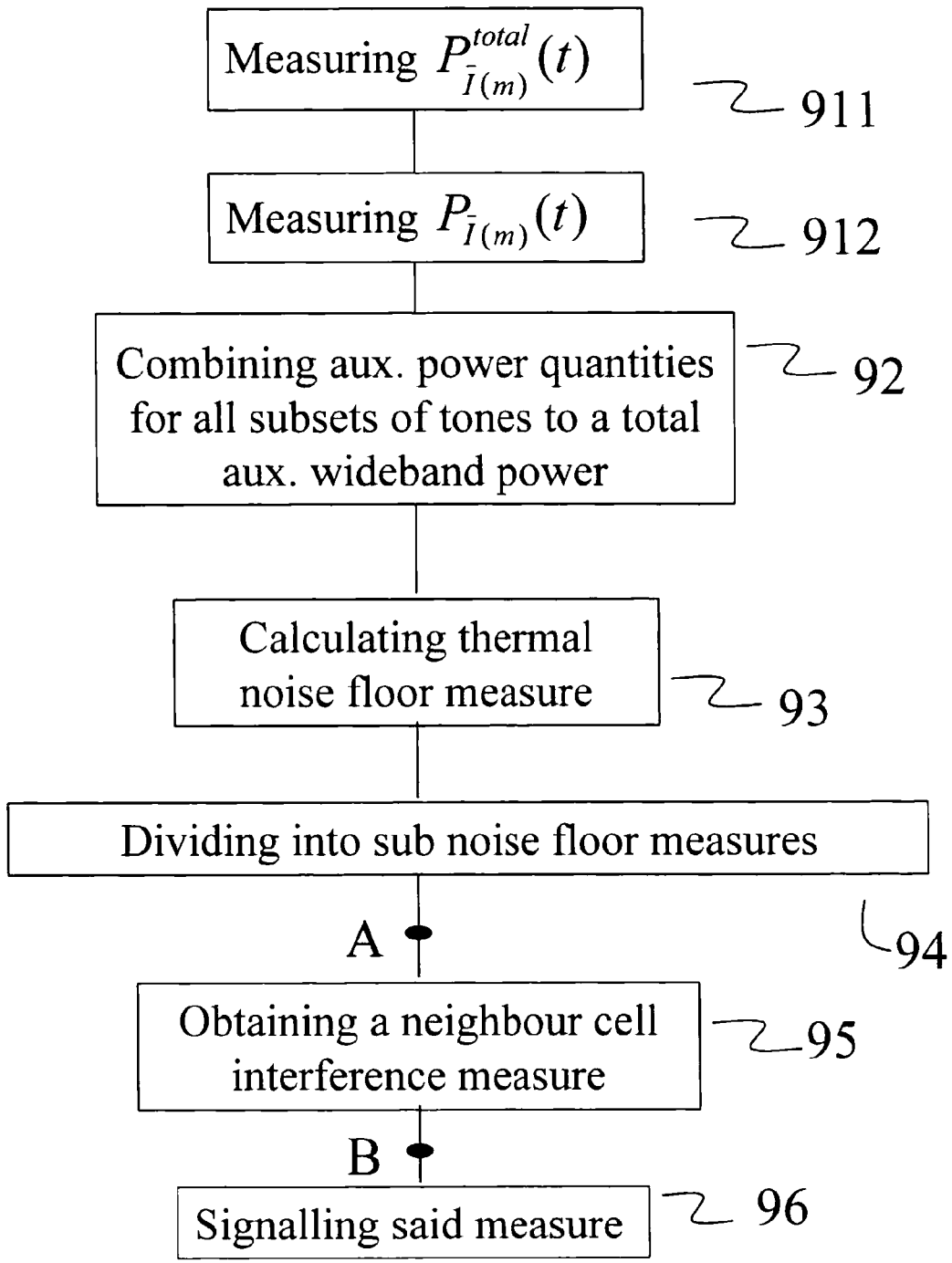
FIG. 7a-7c are flowcharts illustrating the method according to the present invention.
Figure 7B:
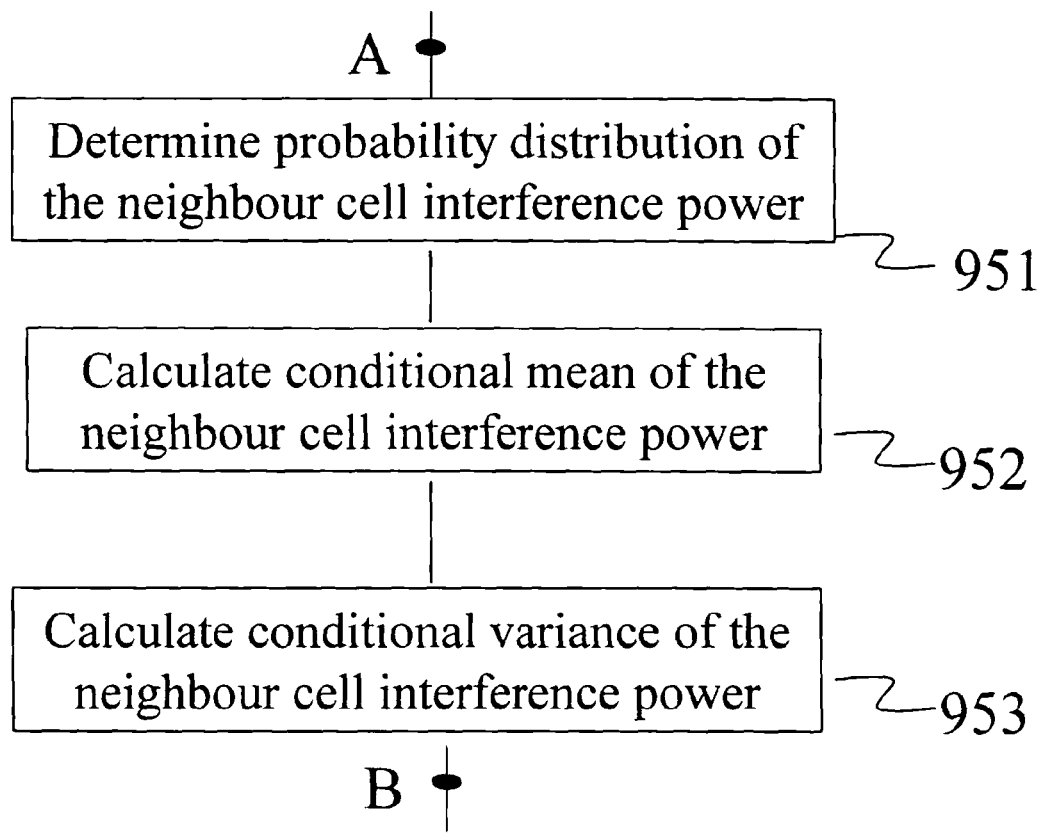
Figure 7C:
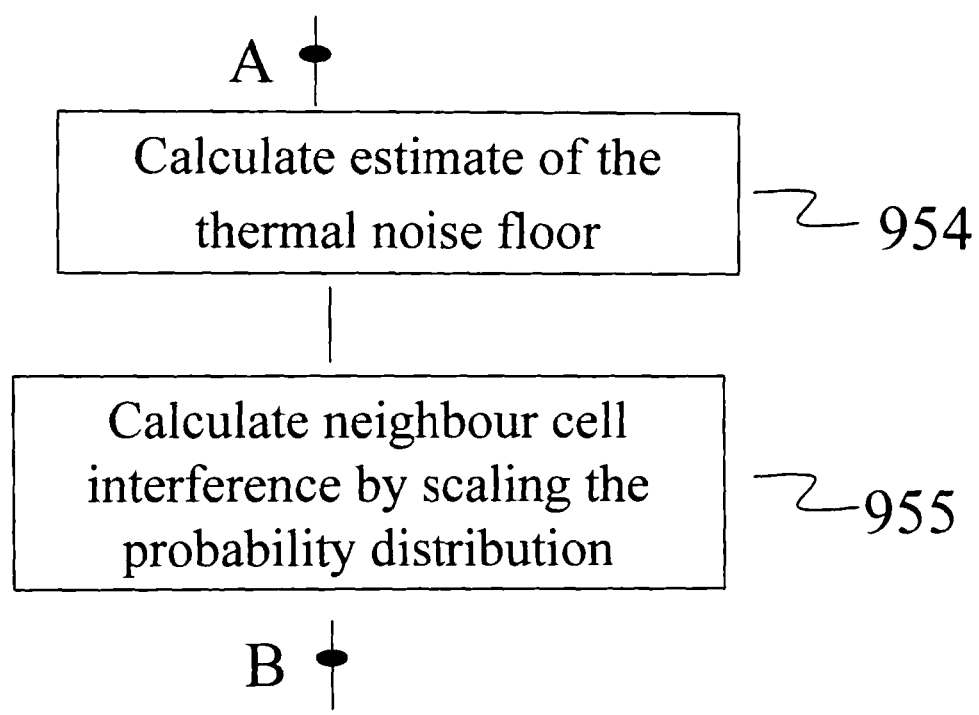
Figure 8:
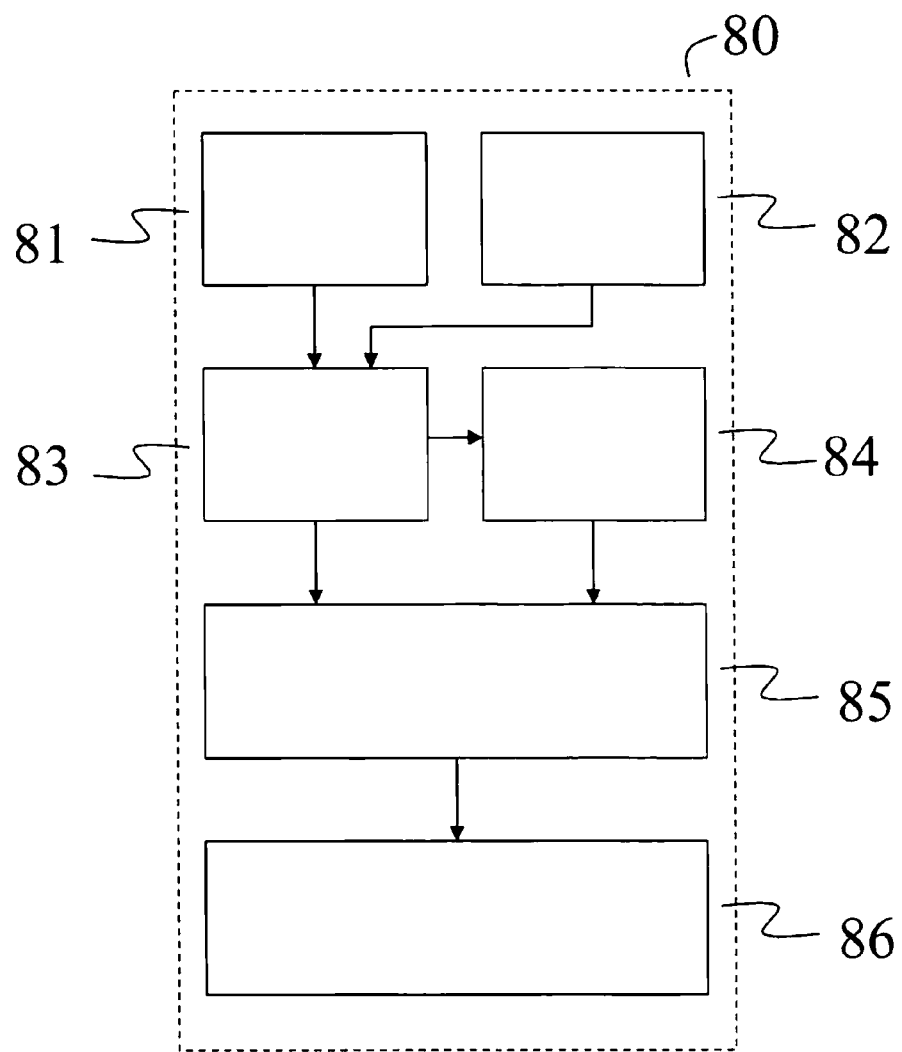
FIG. 8 illustrates a radio access network node according to the invention.

FIG. 6 illustrates main parts of an embodiment according to the present invention in a wireless communication system 70. Said communication system 70 comprises a radio access network 71, e.g. E-UTRAN. A mobile terminal 25 is in radio contact with an eNodeB 20 in the radio access network 71. The eNodeB 20 is connected to a gateway node 72 comprising, inter alia, mobility management entity and user plane entity and connected to the core network (CN) 73. In this embodiment, the eNodeB 20 further comprises means 74 for determining neighbour cell interference estimates and thermal noise floor estimates for subsets of tones for the uplink.

Advantages of the present invention comprise:
  Means for estimation of the thermal noise power floor for subsets of tones in the uplink of an LTE system, said means being optimal, thereby providing a superior estimation performance
  Means for estimation of neighbor cell interference for subsets of tones in the uplink of an LTE system, said mean being optimal, thereby providing superior estimation performance.
  Signaling means for transmission of the optimal estimates to the LTE scheduling function, thereby providing the scheduler with superior information for cellular traffic scheduling decisions.
  Signaling means for transmission of the optimal estimates to the LTE admission control function, thereby providing the admission control function with superior information for cellular traffic scheduling decisions.

The embodiments described above are to be understood as a few illustrative examples of the present invention. It will be understood by those skilled in the art that various modifications, combinations, and changes may be made to the embodiments without departing from the scope of the present invention. In particular, different part solutions in the different embodiments can be combined in other configurations, where technically possible. However, the scope of the present invention is defined by the appended claims.

APPENDIX A

Estimation of the Conditional Probability Distribution of a Minimum Power $$\min_{t' \in [t-T_{Lag}, t]} P^{Total}(t').$$

Note: It is very natural to estimate minimum powers. However, the choice to use the minimum value is really ad-hoc. In a general case, an extreme value of a quantity in some way dependent on the estimated $P^{Total}$ quantity would be possible to use as a base for the further computations. However, as a simplest embodiment the quantity $$\min_{t' \in [t-T_{Lag}, t]} P^{Total}(t')$$

is considered here. Note that $P^{Total}$ in the coming discussion refers to the received total wideband power. In this appendix t is used to denote time.

Notation, Conditional Probability and Baye's Rule

In the following Bayes rule and the definition of conditional mean, for probability distributions, are used extensively. The following definitions and results can be found e.g. in any text book on estimation.

Probability distributions: Consider two events A and B, with probability distributions $f_A(x)$ and $f_B(y)$, respectively. Then the joint probability distribution of A and B is denoted $f_{A,B}(x,y)$.

Note that the events and the conditioning are expressed by subscripts, whereas the independent variables appear within the parentheses. This notation is used only when probability distributions and cumulative probability distributions are used. When state estimates and covariances, e.g. of the Kalman filter, are referred to, the conditioning may also appear within parentheses.

Conditional probability distributions: The conditional probability distributions $f_{A|B}(x)$ and $f_{B|A}(y)$ are defined by:

$$f_{A,B}(x,y) = f_{A|B}(x)f_B(y) = f_{B|A}(y)f_A(x). \quad (A1)$$

Note that as a consequence of the notation for probability distributions, also the conditioning is expressed as subscripts.

A solution of the above equation now results in the famous Bayes rule:

$$f_{A|B}(x) = \frac{f_{B|A}(y)f_A(x)}{f_B(y)}. \quad (A2)$$

Note that the rules above are best understood by using intersecting circle diagrams. The formal proofs to obtain the results for probability distributions can e.g. use infinitesimal limiting versions of motivations for the probability cases.

Conditional Probability of the Minimum—Model and General Expressions

In this section some general properties of a minimum estimator are derived. Towards that end, the following notation is introduced. The Kalman filter or Kalman smoother estimate of $P^{Total}(t')$ is denoted by:

$$\hat{x}_{pTotal}^{Kalman}(t' \mid Y^t) \equiv \hat{x}_{pTotal}^{Kalman}(t' \mid \{y(s)\}_{s\in[-\infty,t]}) \quad (A3)$$
$$= \hat{x}_{pTotal}^{Kalman}\left(t' \mid \{y(s)\}_{s\in[t-T_{Lag},t]}, \hat{x}_{pTotal}^{Kalman}(t-T_{Lag} \mid Y^{t-T_{Lag}})\right).$$

Here t' denotes some time within $[t-T_{Log},t]$. The conditional distributions are, under mild conditions, all Gaussian sufficient statistics, i.e. only second order properties are needed in order to describe the conditional probability distributions. This is reflected in the conditioning in the last expression of (A3). The conditional distributions follow as:

$$f_{\hat{x}_{pTotal}^{Kalman}(t')|Y^t}(x) \in N\left(\hat{x}_{pTotal}^{Kalman}(t' \mid t), \left(\sigma_{pTotal}^{Kalman}(t' \mid t)\right)^2\right), \quad (A4)$$

where $^{Kalman}$ indicates that the estimate is computed with the Kalman filter or if t'<t, the Kalman smoother. The quantities $\hat{x}_{pTotal}^{Kalman}(t'|t)$ and $(\sigma_{pTotal}^{Kalman}(t'|t))^2$ denote the power estimate and the corresponding covariance, respectively, i.e. the inputs to the estimator. Note that (A4) assumes that the corresponding estimate at time $t-T_{Log}$ is used as initial value for the Kalman filter.

Then the conditional distribution for the minimum value of the power estimate can be further developed. Towards that end the following model is assumed for the relation between $x_{pTotal}^0(t')=P^{0,Total}(t')$ that represents the true power and $\hat{x}_{pTotal}^{Kalman}(t'|t)=\hat{P}^{Total}(t'|t)$ that represents the estimate:

$$x_{pTotal}^0(t')=\hat{x}_{pTotal}^{Kalman}(t'|t)+\Delta x_{pTotal}(t'|t) \quad (A5)$$

$$x_{pTotal}^0(t') \in N(\hat{x}_{pTotal}^{Kalman}(t'|t),(\sigma_{pTotal}^{Kalman}(t'|t))^2). \quad (A6)$$

This is in line with the above discussion on sufficient statistics. The notation for the distribution of $\Delta x_{pTotal}(t'|t)$ is henceforward simplified to:

$$f_{\Delta x}(x). \quad (A7)$$

Note that this distribution does not have to be assumed to be Gaussian (although this is mostly the assumption made).

The conditional probability distribution of the minimum value of $x_{pTotal}^0(t')=P^{0,Total}(t')$, $t' \in [t-T_{Log},t]$ is then to be estimated using data y(t), obtained from the time interval $[-\infty,t]$.

As will be seen below, smoother estimates are theoretically required as inputs to the conditional probability estimation algorithm for the minimum power that operates over the time interval $[t-T_{Log},t]$. To formally retain optimality in the development, the smoother estimates should also be calculated using all data in $[t-T_{Log},t]$. However, in a practical implementation, these smoother estimates are typically computed using only a short snapshot of data around the selected smoothing time instance. Several such smoothing estimates, from $[t-T_{Log},t]$, are then combined to estimate the conditional probability distribution. In the coming discussion the interval $[t-T_{Log},t]$ is retained in all quantities though, so as not to complicate the development too much. A further simplification can be obtained by replacement of the smoother estimate with a Kalman filter estimate. Simulations indicate that this can be done with very little loss of performance.

The conditional distribution of the minimum value can now be written as follows (cf. (A5)):

$$f_{min\{x_{pTotal}^0(t')\}_{t' \in [t-T_{Lag},t]} \mid Y^t, min x_{pTotal}^0(t-T_{Lag})}(x), \quad (A8)$$

where the last quantity of (A8) denotes the initial information of the minimum value. In the following Bayes rule and the definition of conditional mean, for probability distributions, are used extensively.

Then apply Bayes rule and the definition of conditional probability to (A8) using the definitions:

$$A:=\min\{x_{pTotal}^0(t')\}_{t' \in [t-T_{Log},t]}$$

$$B:=\min x_{pTotal}(t-T_{Log})^0$$

$$C:=Y^t$$

The following chain of equalities then holds, using Bayes rule, the definition of conditional probability distributions, and the result $f_{B,C|A}(x,y)=f_{(B|A),(C|A)}(x,y)$ (the latter result is easily checked by the drawing of a three-circle diagram):

$$f_{A|B,C}(x) = \frac{f_{B,C|A}(x,y)f_A(x)}{f_{B,C}(x,y)} = \frac{f_{(B|A),(C|A)}(x,y)f_A(x)}{f_{B,C}(x,y)} \quad (A9)$$
$$= \frac{f_{(B|A)(C|A)}(x)f_{C|A}(y)f_A(x)}{f_{B,C}(x,y)} = \frac{f_{B|A,C}(x)f_{C|A}(y)f_A(x)}{f_{B,C}(x,y)}$$
$$= \frac{f_{B|A,C}(x)f_{A|C}(x)f_C(y)}{f_{B,C}(x,y)}.$$

The last step can again be easily verified by drawing circle diagrams. Now, according to the definitions above, the first factor of the numerator of (A9) is a prior and hence the conditioning disappears. The second factor of the numerator will be further expanded below, whereas the last factor of the numerator and the denominator can be treated as parts of a normalizing constant. Back-substitution of the definitions of A, B and C then proves the relation:

$$f_{min\{x_{pTotal}^0(t')\}_{t' \in [t-T_{Lag},t]} \mid Y^t, min x_{pTotal}^0(t-T_{Lag})}(x) = \quad (A10)$$
$$\frac{1}{c} f_{min\{x_{pTotal}^0(t')\}_{t' \in [t-T_{Lag},t]} \mid Y^t}(x) f_{min x_{pTotal}^0(t-T_{Lag})}(x).$$

One consequence of (A10) that needs to be kept in mind is that a smoothing problem is at hand. The Kalman filtering based pre-processing step treated above hence formally needs to include a Kalman smoother step. In practice, the Kalman filter is normally sufficient though.

Final Expansion of the Conditional Mean of the Minimum Power

The starting point of this subsection is equation (A10) that states that the conditional pdf (probability distribution function) is given as the product of a prior (initial value) and a measurement dependant factor. The prior is supplied by the user and should reflect the prior uncertainty regarding $P_N$. Note that whenever the sliding window is moved and a new estimate is calculated, the same prior is again applied. The prior is hence not updated in the basic setting of the estimator.

To state the complete conditional pdf some further treatment of the first factor of (A10) is needed. The error distribution $f_{\Delta I'}(x)$ of (A7), together with the definitions (A5) and (A6) will be central towards this end. Further, in the calculations below, $F(\ )$ denotes a cumulative distribution, i.e. the integral of $f$. $\Pr(.)$ denotes the probability of an event.

The following equalities now hold for the first factor of (A10):

$$F_{\min\{x^0_{pTotal}(t')\}_{t' \in [t-T_{Lag},t]}|Y^t}(x) = \quad (A11)$$

$$\Pr\left(\min\{x^0_{pTotal}(t')\}_{t' \in [t-T_{Lag},t]} \leq x \mid Y^t\right) =$$

$$1 - \Pr\left(\min\{x^0_{pTotal}(t')\}_{t' \in [t-T_{Lag},t]} > x \mid Y^t\right) =$$

$$1 - \Pr\left(\forall t', \Delta x_{pTotal}(t' \mid t) > x - \hat{x}^{Kalman}_{pTotal}(t' \mid t)\right) =$$

$$1 - \prod_{t' \in [t-T_{Lag},t]} \Pr\left(\Delta x_{pTotal}(t' \mid t) > x - \hat{x}^{Kalman}_{pTotal}(t' \mid t)\right) =$$

$$1 - \prod_{t' \in [t-T_{Lag},t]} \left(1 - \Pr\left(\begin{array}{c}\Delta x_{pTotal}(t' \mid t) \leq x - \\ \hat{x}^{Kalman}_{pTotal}(t' \mid t)\end{array}\right)\right) =$$

$$1 - \prod_{t' \in [t-T_{Lag},t]} \left(1 - F_{\Delta x(t'|t)}\left(x - \hat{x}^{Kalman}_{pTotal}(t' \mid t)\right)\right).$$

The fourth equality of (A11) follows from the assumption that the Kalman smoother provides a sufficient statistics, i.e. (A5) and (A6). The last equality follows from (A7). Obviously, the most natural assumption is to use a Gaussian distribution for $F_{\Delta I'(s)}$. However, (A11) actually allows other distributions as well.

The final step in the derivation of the first factor of the distribution function is to differentiate (A11), obtaining:

$$f_{\min\{x^0_{pTotal}(t')\}_{t' \in [t-T_{Lag},t]}|Y^t}(x) = \quad (A12)$$

$$\frac{dF_{\min\{x^0_{pTotal}(t')\}_{t' \in [t-T_{Lag},t]}|Y^t}(x)}{dx} =$$

$$\sum_{t' \in [t-T_{Lag},t]} f_{\Delta x(t'|t)}\left(x - \hat{x}^{Kalman}_{pTotal}(t' \mid t)\right)$$

$$\prod_{\substack{q \in [t-T_{Lag},t] \\ q \neq t'}} \left(1 - F_{\Delta x(t'|t)}\left(x - \hat{x}^{Kalman}_{pTotal}(q \mid t)\right)\right)$$

Combining with (A10), gives the end result:

$$f_{\min\{x^0_{pTotal}(t')\}_{t' \in [t-T_{Lag},t]}|Y^t, \min x^0_{pTotal}(t-T_{Lag})}(x) = \quad (A13)$$

$$\frac{1}{c}\left(\begin{array}{c}\sum_{t' \in [t-T_{Lag},t]} f_{\Delta x(t'|t)}\left(x - \hat{x}^{Kalman}_{pTotal}(t' \mid t)\right) \\ \prod_{\substack{q \in [t-T_{Lag},t] \\ q \neq t'}} \left(1 - F_{\Delta x(t'|t)}\left(x - \hat{x}^{Kalman}_{pTotal}(q \mid t)\right)\right)\end{array}\right) f_{\min x^0_{pTotal}(t-T_{Lag})}(x)$$

This result constitutes the output 64 referred to in connection with FIG. 2. The expression may look complex. It is fortunately straightforward to evaluate since it is a one dimensional function of Gaussian and cumulative Gaussian distributions given by:

$$f_{\Delta x(t'|t)}\left(x - \hat{x}^{Kalman}_{pTotal}(t' \mid t)\right) = \frac{1}{\sqrt{2\pi}\,\sigma^{Kalman}_{pTotal}(t' \mid t)} e^{-\frac{\left(x - \hat{x}^{Kalman}_{pTotal}(t' \mid t)\right)^2}{2\left(\sigma^{Kalman}_{pTotal}(t' \mid t)\right)^2}} \quad (A14)$$

$$F_{\Delta x(t'|t)}\left(x - \hat{x}^{Kalman}_{pTotal}(t' \mid t)\right) = \int_{-\infty}^{x - \hat{x}^{Kalman}_{pTotal}(t' \mid t)} f_{\Delta x(t'|t)}(y) dy$$

$$= \frac{1}{2} \operatorname{erfc}\left(\frac{\left(x - \hat{x}^{Kalman}_{pTotal}(t' \mid t)\right)}{\sqrt{2}\,\sigma^{Kalman}_{pTotal}(t' \mid t)}\right). \quad (A15)$$

The quantities $\hat{x}_{pTotal}^{Kalman}(t'|t)$ and $\sigma_{pTotal}^{Kalman}(t'|t)$ are readily available as outputs from the Kalman smoother, or the simpler Kalman filter.

If a noise floor value is to be provided as an output, a mean value computation is performed on the output distribution.

In summary, the above derived expression can be rewritten as $$f_{min}(P_k) = \sum_{i=1}^{N_{PowerSamples}} \quad (A16)$$

$$\left(f_{PowerSample}(i,k) \sum_{\substack{j=1 \\ j \neq i}}^{N_{PowerSamples}} (1 - F_{PowerSamples}(j,k))\right)$$

The invention claimed is:

1. A method for neighbor cell interference estimation comprising:
    measuring a total uplink power per subset of tones;
    measuring a own-channel power per the same subset of tones;
    calculating an auxiliary power quantity for each subset of tones as the total uplink power per subset of tones minus the own-channel power per subset of tones minus the leakage of power from other subsets of tones;
    combining the auxiliary power quantities for all subsets of tones to obtain a total auxiliary wideband power for the entire uplink band;
    calculating a thermal noise floor measure based on said total auxiliary wideband power quantity; and
    dividing said calculated thermal noise floor measure into sub noise floor measures for each subset of tones, said dividing dependent on the bandwidth of each subset of tones, for obtaining a neighbor cell interference measure for each subset of tones from at least said sub noise floor measures.

2. The method of claim 1, wherein
the step of combining comprises an addition of the auxiliary power quantities for all subsets of tones; and
the step of calculating the thermal noise floor measure comprises storing the auxiliary power samples in a sliding window and calculating the minimum j of power samples in said sliding window;
wherein the neighbor cell interference is calculated by scaling the noise floor measure for each of the subsets of tones and calculating the auxiliary power quantity minus the scaled noise floor measure for each subset.

3. The method of claim 2, comprising the step of signaling one or more of the estimated parameters for each subset of tones for
the sum of all contributions of emitted radio frequency power of mobile terminals in neighboring cells, $$\hat{P}^N_{I(mi)},$$

and
the thermal noise of the frequency sub-bands, $\hat{P}_{NJ(mi)}$.

4. The method of claim 2, whereby said leakage of power is calculated from all channel powers corresponding to other subsets of tones in the own cell.

5. The method of claim 4, whereby said leakage power is calculated according to $$P^L_{I(m_i),measurement}(t) = K \sum_{f_j \in I(m_i)} \sum_{f_k \neq f_j} P_{f_k,measurement}(t) \left( \frac{\sin\left(\frac{2\pi(f_k - f_j)}{\Delta f_{Tone}}\right)}{\left(\frac{2\pi(f_k - f_j)}{\Delta f_{Tone}}\right)} \right)^2.$$

6. The method of claim 1, whereby
said auxiliary power quantity constitutes a mean value and a variance corresponding to a Gaussian probability distribution for each subset of tones, said probability distribution obtained by optimum filtering;
said noise floor measure constitutes a conditional probability distribution of the minimum of the total auxiliary power over said sliding window;
and further comprising the steps of
storing the probability distribution of said combined auxiliary power quantities in a sliding window over time; and
said dividing being performed by a transformation of the conditional probability distribution of the minimum of the total auxiliary power over said sliding window; and said transformation dependent on the bandwidth of each subset of tones.

7. The method of claim 6, further comprising the step of calculating an optimal estimate of the thermal noise floor as a conditional mean of the probability distribution.

8. The method of claim 7, whereby the neighbor cell interference is calculated by
calculating the optimal estimate of the probability distribution dependent on the bandwidth for each subset of tones; and
calculating the auxiliary power quantity minus the own cell channel power minus the scaled noise floor minus leakage of power for each subset of tones.

9. The method of claim 6, whereby said step of obtaining a neighbor cell interference measure determines the probability distribution of the neighbor cell interference power for each subset of tones according to a difference distribution between said auxiliary power quantity and said divided sub noise floor measures, both for each subset of tones.

10. The method of claim 9, further comprising the step of calculating an optimal estimate of the neighbor cell interference, said estimate calculated as a conditional mean.

11. The method of claim 10, further comprising the step of calculating an optimal estimate of the neighbor cell interference, said estimate calculated as a conditional variance.

12. The method of claim 10, comprising the step of signaling one or more of the estimated parameters for each subset of tones for the sum of all contributions of emitted radio frequency power of mobile terminals in neighboring cells, $$\hat{P}^N_{I(mi)},$$

the thermal noise of the frequency sub-bands, $\hat{P}_{NJ(mi)}$, and the own-channel power of mobile terminals in the own cell $\hat{P}_{I(mi)}$.

13. The method of claim 12, further comprising the step of signaling one or more of the variances for said estimated parameters.

14. The method of claim 6, whereby the auxiliary power is further dependent on a calculated leakage power, said leakage power being obtained from the own-channel power for each subset of tones.

15. The method of claim 14, whereby said leakage power is calculated according to $$P^L_{I(m_i),measurement}(t) = K \sum_{f_j \in I(m_i)} \sum_{f_k \neq f_j} P_{f_k,measurement}(t) \left( \frac{\sin\left(\frac{2\pi(f_k - f_j)}{\Delta f_{Tone}}\right)}{\left(\frac{2\pi(f_k - f_j)}{\Delta f_{Tone}}\right)} \right)^2.$$

16. The method of claim 1, whereby said auxiliary power is selected as the total power per subset of tones, and said obtaining of a neighbor cell interference measure is further based on the own-channel power and leakage power, both for each subset of tones.

17. The method of claim 16, comprising the step of signaling one or more of the estimated parameters for each subset of tones for
the sum of all contributions of emitted radio frequency power of mobile terminals in neighboring cells, $$\hat{P}^N_{I(mi)},$$

and
the thermal noise of the frequency sub-bands, $\hat{P}_{NJ(mi)}$.

18. A node in a wireless communication system, comprising
one or more measurement circuits for measuring the total uplink power per subset of tones, and for measuring the own-channel power per the same subset of tones;
a combining circuit for calculating an auxiliary power quantity for each subset of tones as the total uplink power per subset of tones minus the own-channel power per subset of tones minus the leakage of power from other subsets of tones and combining for all subsets of tones the auxiliary power quantities to obtain a total auxiliary wideband power for the entire uplink band;

a calculation circuit for calculating a thermal noise floor measure based on said combined auxiliary power quantity;

a processing circuit for obtaining a neighbor cell interference measure for each subset of tones from at least said noise floor measure for each subset of tones by dividing said calculated thermal noise floor measure into sub noise floor measures for each subset of tones; and a signaling circuit for signaling said measure to another function in said node or another node in said wireless communication system.

* * * * *